Dec. 11, 1962 W. J. BIELSTEIN Re. 25,298

METHOD OF PERFORATING WELL CASING

Original Filed Sept. 7, 1954 5 Sheets-Sheet 1

*INVENTOR.*
WALTER J. BIELSTEIN,
*BY*
ATTORNEY.

METHOD OF PERFORATING WELL CASING

Original Filed Sept. 7, 1954 5 Sheets-Sheet 2

INVENTOR.
WALTER J. BIELSTEIN,
BY
ATTORNEY.

METHOD OF PERFORATING WELL CASING

Original Filed Sept. 7, 1954 5 Sheets-Sheet 3

INVENTOR.
WALTER J. BIELSTEIN,
BY
Thomas B. McBride
ATTORNEY.

METHOD OF PERFORATING WELL CASING

Original Filed Sept. 7, 1954 5 Sheets-Sheet 4

*INVENTOR.*
WALTER J. BIELSTEIN,
*BY*
Thomas B. McBride
ATTORNEY.

METHOD OF PERFORATING WELL CASING

Original Filed Sept. 7, 1954 5 Sheets-Sheet 5

*INVENTOR.*
WALTER J. BIELSTEIN,
*BY*
Thomas B. McMullen
ATTORNEY.

United States Patent Office

Re. 25,298
Reissued Dec. 11, 1962

25,298

METHOD OF PERFORATING WELL CASING

Walter J. Bielstein, Nueces County, Tex., assignor, by mesne assignments, to Jersey Production Research Company, Tulsa, Okla., a corporation of Delaware Original No. 2,891,620, dated June 23, 1959, Ser. No. 618,937, Oct. 29, 1956, which is a division of Ser. No. 454,342, Sept. 7, 1954. Application for reissue July 15, 1960, Ser. No. 43,257

13 Claims. (Cl. 166—35)

Matter enclosed in heavy brackets [ ] appears in the original patent but forms no part of this reissue specification; matter printed in italics indicates the additions made by reissue.

The present invention is directed to a method and apparatus for completing and treating a well. More particularly, the invention is directed to a method and apparatus for completing a well below the open end of a tubing. In its more specific aspects, the invention is directed to method and apparatus wherein a tubing is permanently arranged in a well casing.

This application is a division of U.S. Serial No. 454,342, filed September 7, 1954, for Walter J. Bielstein, now U.S. Patent 2,781,098 issued February 12, 1957.

The present invention may be briefly described as a method for treating a cased well having a tubing permanently arranged in the cased well with the lower open end of the tubing arranged at a level above a plurality of hydrocarbon productive strata. In the present invention the casing is perforated in the first of the hydrocarbon productive strata following which the lower open end of the tubing is closed. A treating fluid, such as fresh or salt water, is then circulated down the annulus between the tubing and casing and along the length of the casing below the tubing at least in contact with the perforations. The treating liquid is then conducted to the tubing and flows up the tubing. Thereafter, the lower end of the tubing is opened and the well is then produced up the tubing.

It is contemplated that the present invention will involve the conducting of a treating fluid, such as a low water loss fluid cement, down the tubing and spotting the fluid cement in the region of the perforations in the first stratum under conditions to seal the perforations following which a washing liquid, such as fresh or salt water, will be circulated down the annulus to remove excess fluid cement from the casing following which the washing liquid and fluid cement is conducted to the tubing and flowed upwardly therein before the lower end of the tubing is opened and the casing perforated in second hydrocarbon productive stratum.

The perforating of the casing in the second hydrocarbon productive stratum may be performed by lowering a gun perforator through the open end of the tubing and firing the gun through the casing in the second hydrocarbon productive stratum.

It is contemplated in the practice of the present invention that the cement may be allowed to fill the perforations to form a filter cake therein to seal the perforations, or a body of cement may be arranged in the casing in contact with the perforations and pressure applied to the cement to squeeze same into the perforations or into the strata to seal the perforations.

It is contemplated in the method of the present invention that a treating liquid, such as fluid cement, acid, acid gel, fresh or salt water, suspensions of solids of oil and the like, may be flowed down the tubing to treat the well or formation. Such treating operations may include washing the well to remove sand, cementing operations, fracturing of the formation through the perforations, treatment of a formation with acid or with acid gel, or forming new perforations in the casing by firing a gun perforator in a clean liquid and the like.

The present invention also comprises apparatus for conducting permanent well completions wherein the tubing string is permanently arranged in the casing at a level above a plurality of hydrocarbon productive strata. This apparatus comprises a mandrel adapted to be connected to the lower open end of the tubing string having a passageway adapted to communicate with the tubing on connection thereto. A tubular member is connected to the lower end of the mandrel on an axis offset from the longitudinal axis of the tubing. The tubular member may be of a length sufficiently great to extend from the lower open end of the tubing to a level below the hydrocarbon productive stratum or may extend to within the series or plurality of hydrocarbon productive strata. A packer assembly may be connected to the mandrel for closing off the annulus between the tubing and the casing. Arranged in the mandrel co-axially with the longitudinal axis of the tubing is flow directing means for directing fluid flow from the tubing through the mandrel to the tubular member and from the annulus to the packer assembly. A nipple is connected to the mandrel co-axially with the longitudinal axis of the tubing and a retrievable means, such as a plug, is arranged in the nipple for opening and closing the nipple. The nipple may be used to direct fluid flow from the tubing through the mandrel to the tubular member.

The tubular member may be provided with a track which extends substantially the length of the tubular member and the nipple is provided on its internal surface with a spiral indexing means for positioning an elongated carriage, such as a tubing gun perforator, lowered through the tubing and nipple on the track member.

The flow directing means for directing fluid flow through the mandrel and through the packer assembly may be a rotatable polish joint having a flow passage arranged therein or may be a retrievable plug provided with flow passages.

The present invention will be further illustrated by reference to the drawing in which:

FIG. 11 is a sectional view of a production plug also shown in FIG. 10a.

Figure 1:
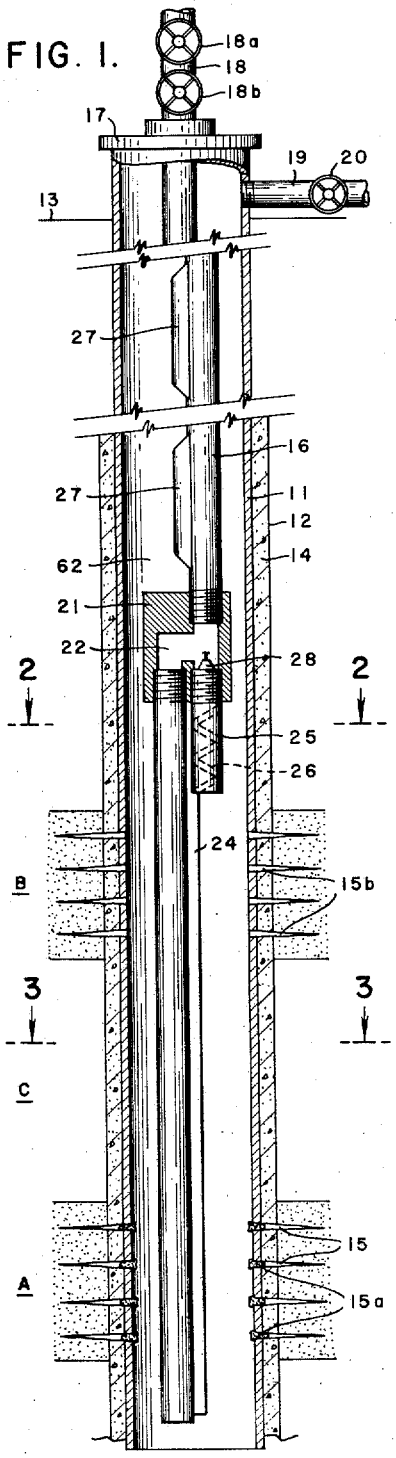
FIG. 1 shows an arrangement of the apparatus of the present invention in a cased and tubed well.
Figure 2:
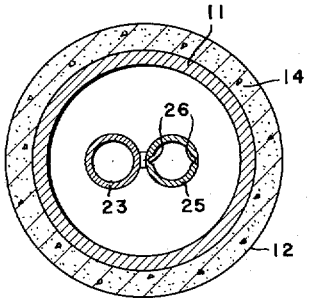
FIG. 2 is a sectional view taken along the lines 2—2 of FIG. 1.
Figure 3:
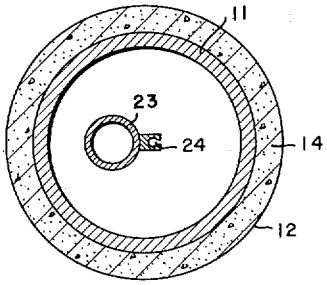
FIG. 3 is a sectional view taken along the lines 3—3 of FIG. 1.

Referring now to the drawing in which identical numerals will be employed to designate identical parts, numeral 11 designates a well casing which has been arranged in a well bore 12 drilled from the earth's surface 13. The well casing 11 has been cemented in place with cement 14 and the casing 11 has been perforated to form perforations 15 through the casing 11 and cement 14 to penetrate a hydrocarbon production stratum A which has been penetrated by the well 12 and from which production of hydrocarbons has been obtained.

A tubing string 16 has been arranged in the casing 11 from the wellhead 17 and is provided with Christmas tree 18. The casing 11 has a conduit 19 controlled by casing annulus valve 20. The Christmas tree is provided with valves 18a and 18b.

Arranged on the lower end of the tubing 16 is a mandrel 21. This mandrel is provided with a passageway 22 which communicates with the interior of the tubing 16 and has connected to it on an axis offsetting the longitudinal axis of the tubing a tubular member 23 which has a track member 24 arranged on the exterior surface thereof extending substantially the length of the tubular member. Connected to the mandrel 21 co-axially with the tubing 16 is a nipple 25 which is provided with a spiral indexing means 26 which serves to position a gun perforator lowered through the tubing onto the track 24.

The tubing 16 is provided with a plurality of wire line gas-lift valve mandrels 27 which are arranged on the tubing 16 at vertically spaced-apart intervals as is conventional to the art.

It is to be noted that the tubular member 23 extends from the lower open end of the tubing 16 to the lower end of the casing 11. It is possible to direct fluid through the tubing 16 and through passageway 22 in the mandrel 21 by providing in the nipple 25 a retrievable tubing plug 28 which serves to close the open end of the tubing 16 and to direct fluid into the tubular member 23.

Figure 4:
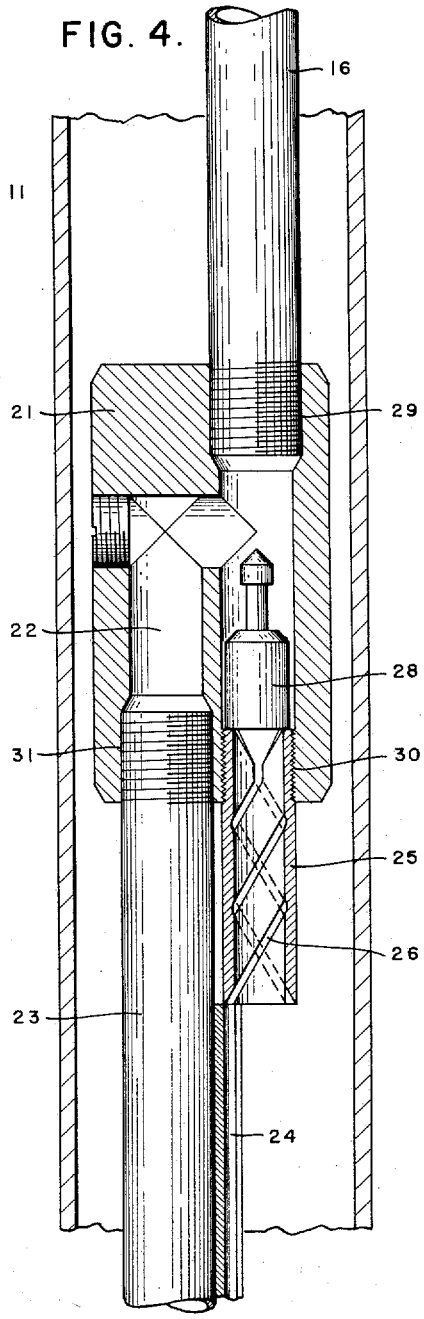
FIG. 4 is a sectional view showing a detail of the indexing means and plug illustrated in FIG. 1.
Figure 5:
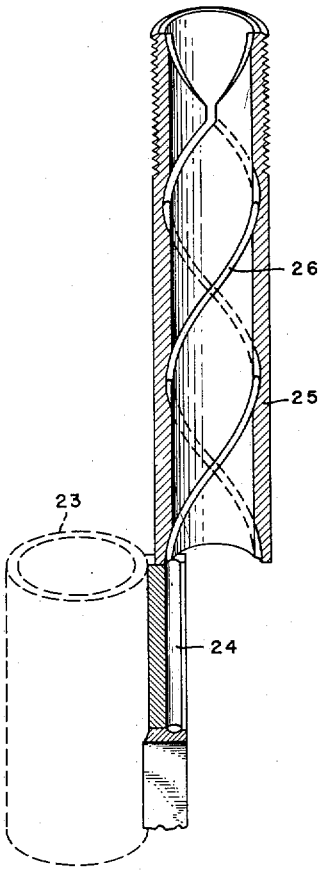
FIG. 5 is a detailed sectional view of the indexing means and track member of FIG. 1.

Referring now to FIG. 4, it will be seen that the mandrel 21 is connected to the lower end of the tubing 16 by mating threads 29 and the nipple 25 is connected to the mandrel 21 by mating threads 30. The tubular extension member 23 is also connected to the mandrel 21 by mating threads 31. It is to be noted that the plug 28 closes the nipple 25 and directs flow from the tubing 16 by way of passageway 22 into the tubular member 23.

Figure 6:
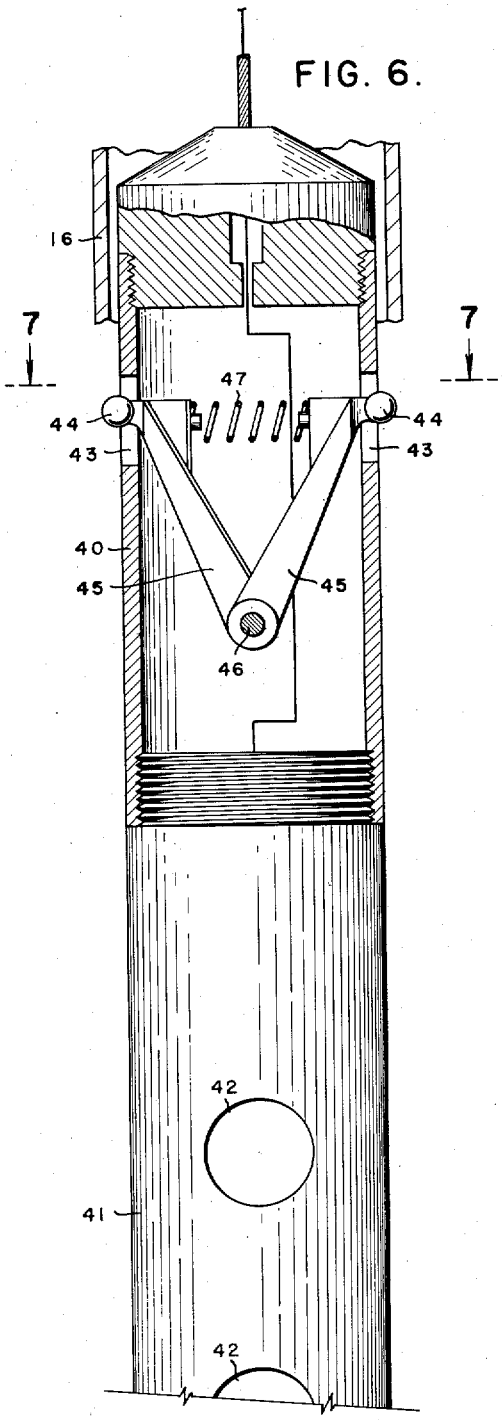
FIG. 6 shows an arrangement for connection to a gun carriage for positioning the gun on the track member of FIG. 1.
Figure 7:
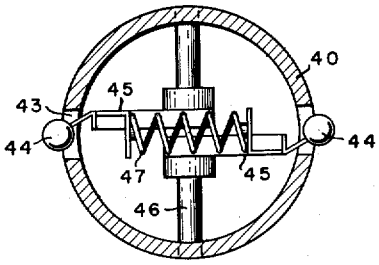
FIG. 7 is a cross-sectional view of the apparatus of FIG. 6.

Referring now to FIG. 6, a tubing gun perforator 41, which may be provided with conventional bullets or shaped charges 42, has an upper housing 40 which is provided with slots 43 through which spherical followers 44 project to engage with the spiral or indexing means 26 in nipple 25. These spherical followers 44 are carried on rocker arms 45 which are arranged on a rocker arm pin 46, as shown. The rocker arms 45 are biased outwardly through slots 43 by biasing means such as coil springs 47. The gun perforator is designed to be run through tubing 16, out nipple 25, along track member 24 to a position for perforating casing 11.

Figure 8:
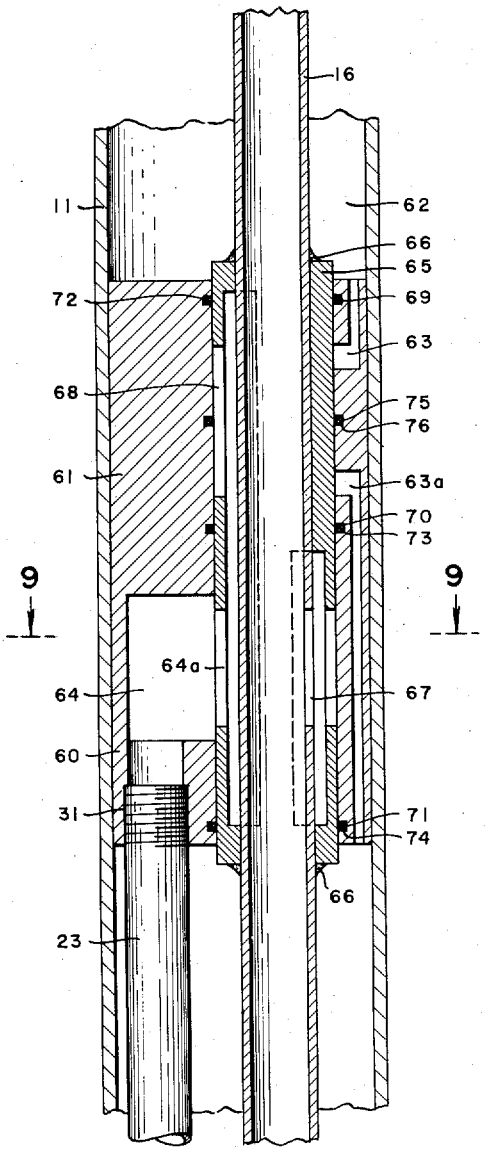
FIG. 8 shows a detail of the device of the present invention with a packer assembly.

Referring now to FIG. 8, set in the casing 11 is a packer assembly 61 having a mandrel 60 forming an integral part thereof. The packer assembly 61 closes off the annulus 62 between the tubing 16 and the casing 11.

The packer assembly 61 is provided with by-pass conduits 63 and 63a while the mandrel 60 has a passageway 64 communicating with the extension member 23 which is connected to the mandrel 60 by mating threads 31.

Rotatably arranged in the mandrel 60 and packer assembly 61 is a polish joint 65 which is connected rigidly to the tubing 16 such as by welds 66. The tubing 16 has a window or slot 67 therein which serves to communicate with the passages 64 and the packer assembly 61 has a port 68 which allows communication between the passageways 63 and the annulus 62.

The mandrel 60 and the packer assembly 61 are suitably sealed by a sealing means 69, 70 and 71 arranged, respectively, in recesses 72, 73 and 74. A sealing member 75 is likewise arranged in recess 76 for providing a seal between the packing assembly 61 and the member 65.

Figure 10:
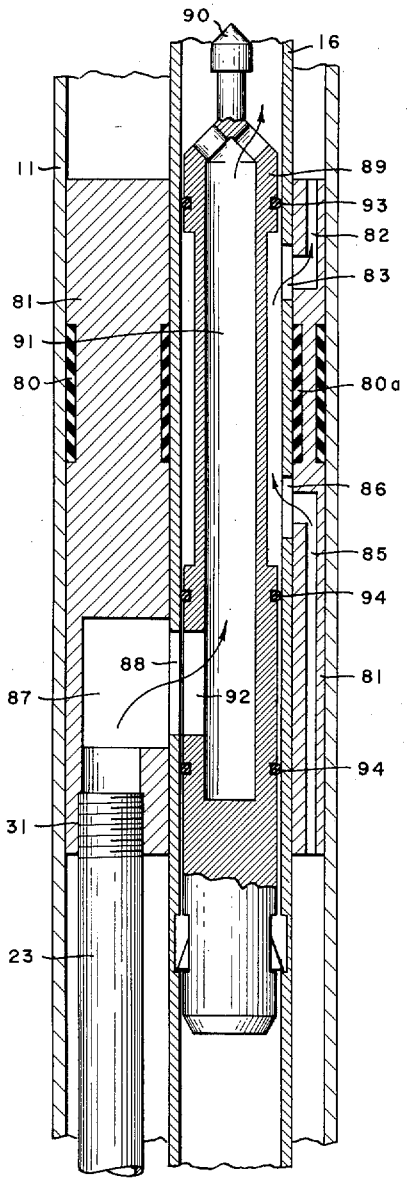
FIGS. 10 and 10a show a modification of the apparatus of FIG. 8.
Figure 10A:
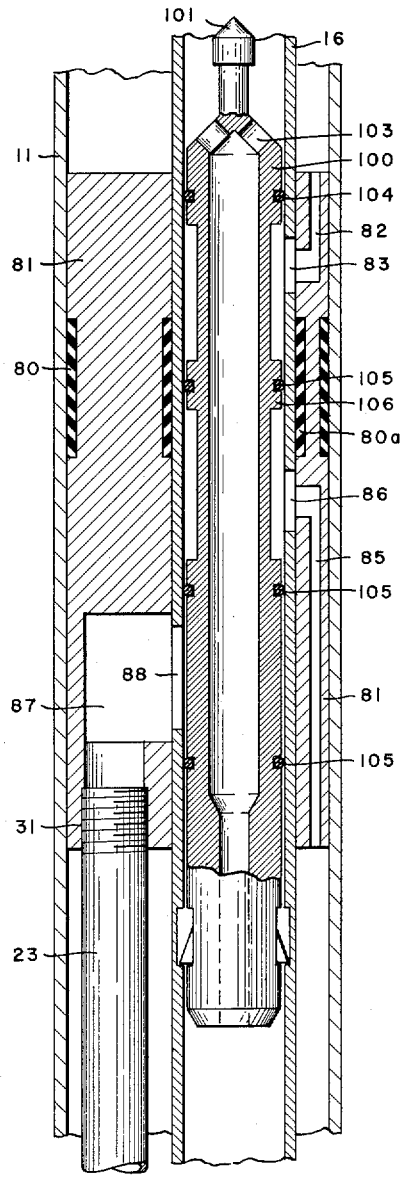

Referring now to FIGS. 10 and 10a, set in the casing 11 is a mandrel assembly 81 to which the extension member 23 is connected by mating threads 31. The mandrel assembly 81 is provided with packers 80 and 80a. The mandrel assembly 81 is also provided with a first bypass conduit 82 opening into port 83 of tubing 16 and a second bypass conduit 85 opening into port 86 of tubing 16. The mandrel 81 has a passageway 87 communicating with a port 88 in the tubing 16.

In FIG. 10 wire line flow directing means 89 is arranged in the tubing 16 for directing flow through the extension member 23. The wire line plug 89 is provided with a fishing neck 90 and is provided with a central passageway 91 which has an opening 92 which communicates with the opening 88 and the passageway 87 allowing fluids to flow through the tubing 16, the passageway 91 and through the extension member 23. It will be noted with respect to FIG. 10 that the plug 89 is provided with sealing members 93 and 94.

Figure 11:
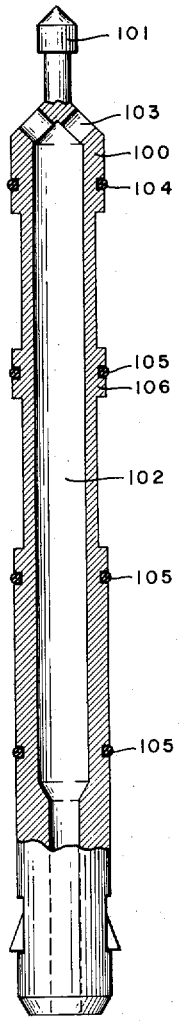

In the embodiment of FIGS. 10*a* and 11 the plug 89 has been replaced by a production plug 100 provided with a fishing neck 101 which serves to close the flow through the bypasses 82 and 85 and through the passageways 87 and 91 allowing production from the well through passageway 102 and through openings 103.

The plug 100 is provided with seals 104 and 105 which serve to close off flow through the bypassing conduits and through the extension member. The external shoulder 106 effectively closes the flow between passageways 82 and 85.

The invention operates as follows:

It will be noted that the tubing 16 is arranged in casing 11 having the tubular member 23 connected thereto and made up with the tubing 16 as it is aranged in the casing. For purposes of this description it may be assumed that production from stratum A has reached a point where water and/or gas invasion has made the production of liquid hydrocarbons noncommercial and it is desirable to open up production in stratum B which is separated from stratum A by a non-productive stratum, such as C, which may be shale or the like Under these conditions, a clean fluid, such as salt water or the like, will be circulated down the annulus 62 following the direction of the arrows and upwardly through the lower open end of the tubular member 23 and upwardly through the tubing 16 to the wellhead 17 and outwardly through the Christmas tree 18 This circulation is continued until the well is completely washed and the circulation of clean fluid is terminated A treating agent, such as cement, which may be a low water loss fluid cement, such as described by Salathiel in U.S. 2,482,459, or other low water loss fluid cements available on the market may be used. This cement is flowed downwardly through the tubing 16 and is directed into the extension member 23 by the wire line tubing plug 28 which has been placed in the nipple 25 before the circulation, as has been described, is initiated. The cement flows downwardly through the tubing and tubing extension and upwardly in the casing to the region of the perforations 15. This cement may be allowed to fill the perforations 15 and form a filter cake or buttons therein as shown and indicated generally by the numeral **15*a* which serves to seal off the stratum A. It may be desirable, however, to spot a body of fluid cement in the region of the perforations 15 and to impose pressure on the cement, such as with a Bradenhead squeeze, the technique of which is well known to the art. In any event, after the perforations 15 have been closed and sealed against fluid intrusion from stratum T, clean fluid is circulated down the annulus 62 to wash out the excess fluid cement remaining in the casing 11 This washing fluid and fluid cement are directed up the tubular member 23 and through the tubing 16 to the surface of the earth 13, through wellhead 17 and Christmas tree 18**.

Thereafter the tubing plug 28 is pulled by running a wire line with a suitable fishing tool on the end of it to pull the plug 28 from the tubing 16. A tubing gun perforator, such as illustrated in FIG. 6, is then attached to the wire line and lowered through the tubing 16 and through the mandrel 21 into the nipple 25. The spiral followers engage with the spirals 26 which on continued lowering of the tubing gun 41 cause the tubing gun and the upper housing 40 to be positioned on the track 24, one of the spiral followers engaging with the track 24 and positioning the gun. By virtue of positioning the gun perforator 41 on the track 24, it is possible to perforate the casing 11 in the stratum sand or interval B which is hydrocarbon productive and also to perforate the casing 11 in the stratum B in a predetermined direction without damaging the tubular member 23. After the casing 11 has been perforated in the stratum B, the tubing gun is pulled by means of a wire line and production is then had from the stratum B through the perforations 15*b* opened up therein. This series of operations may be repeated for as many producing intervals or strata as may be encountered below the lower open end of the tubing 16.

Figure 9:
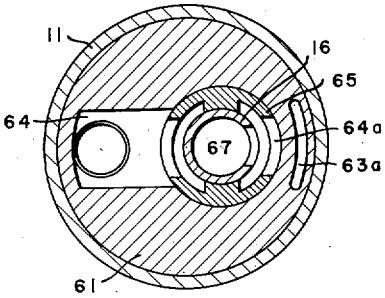
FIG. 9 is a view taken along the lines 9—9 of FIG. 8 showing the flow directing means.

In the apparatus of FIGS. 8 and 9 wherein a packer assembly 61 is used, it is possible to direct the flow of fluid through the extension member 23 and through the packer assembly by rotating the tubing 16 to allow communication between the passageways 63 and 63*a* and between the tubing 16 and the extension member 23 utilizing the treating sequence of operations as described with respect to FIG. 1.

The same result may be achieved by cementing and circulating out with respect to FIGS. 10*a* and 11 as described with respect to FIG. 1 and FIGS. 8 and 9, in this latter instance the plug 89 being used when circulating and cementing and the plug 100 being used when producing.

As stated, the present invention is susceptible to many well servicing operations and has considerable utility in that all operations may be conducted without requiring heavy-duty lifting equipment. In fact, the tubing is permanently set in the casing and completing and servicing operations are conducted by use of wire line tools as has been described of by simply rotating the tubing to achieve the desired circulation patterns which are required.

The invention may be used in fracturing formations, in acidizing operations, in washing for removal of sand from casing and for gum perforating operations.

The nature and objects of the present invention having been completely described and illustrated, what I wish to claim as new and useful and to secure by Letters Patent is:

1. In a method of perforating a well casing having parallel first and second pipes arranged therein in side-by-side relationship with the second pipe extending a substantial distance below the lower open end of the first pipe, the steps of lowering a perforator through the first pipe, orienting said perforator in said casing below the first pipe and adjacent the second pipe such that the operative surface of said perforator is directed toward the casing and away from the second pipe, and operating said perforator to perforate only said casing below the first pipe and adjacent the second pipe.

2. In a method of perforating a well casing having parallel first and second pipes arranged therein in side-by-side relationship with the second pipe extending a substantial distance below the lower open end of the first pipe, the steps of lowering a gun perforator through the first pipe, orienting said perforator in said casing below the first pipe and adjacent the second pipe by at least partially rotating same such that the operative surface of said perforator is directed toward the casing and away from the second pipe, and firing said perforator to perforate only said casing below the first pipe and adjacent the second pipe.

3. In a method of perforating a well casing having parallel first and second pipes arranged therein in side-by-side relationship with the second pipes extending a substantial distance below the lower open end of the first pipe, the steps of lowering a bullet gun perforator through the first pipe, orienting said perforator in said casing below the first pipe and adjacent the second pipe such that the operative surface of said perforator is directed toward the casing and away from the second pipe, and operating said perforator to perforate only said casing below the first pipe and adjacent the second pipe.

4. In a method of perforating a well casing having parallel first and second pipes arranged therein in side-by-side relationship with the second pipe extending a substantial distance below the lower open end of the first pipe, the steps of lowering a shaped charge perforator through the first pipe, orienting said perforator in said casing below the first pipe and adjacent the second pipe such that the operative surface of said perforator is directed toward the casing and away from the second pipe, and operating said perforator to perforate only said casing below the first pipe and adjacent the second pipe.

5. In a method of perforating a well casing having parallel first and second pipes arranged therein in side-by-side relationship with the second pipe extending a substantial distance below the lower open end of the first pipe, the steps of lowering a gun perforator through the first pipe, orienting said perforator in said casing below the first pipe and adjacent the second pipe such that the operative surface of said perforator is directed toward the casing and away from the second pipe, firing said perforator to perforate only said casing below the first pipe and adjacent the second pipe, and then retrieving said perforator through said first pipe.

*6. In a method for completing a well traversing a plurality of subsurface formations, the steps which comprise arranging a pipe string in said well, lowering a perforator in said pipe string, horizontally orienting said perforator in said pipe string to position its operative surface into a predetermined angular position, vertically moving said oriented perforator adjacent a selected of said formations while maintaining it in said predetermined position, and then operating said oriented perforator to pierce said selected formation.*

*7. In a method for completing a well traversing a plurality of subsurface formations in which a pipe string is arranged in said well, the steps which comprise lowering a perforator in said pipe string, horizontally orienting said perforator in said pipe string to position its operative surface into a predetermined angular position, vertically moving said oriented perforator adjacent a selected of said formations while maintaining it in said predetermined position, and then operating said oriented perforator to pierce said selected formation.*

*8. In a method for completing a well traversing a plurality of subsurface formations in which a pipe string is arranged in said well, the steps which comprise lowering a perforator in said pipe string, horizontally orienting said perforator in said pipe string to position its operative surface into a predetermined angular position, moving said oriented perforator adjacent a selected of said formations while maintaining it in said predetermined position, and then operating said oriented perforator to pierce said selected formation.*

*9. In a method for completing a well traversing a plurality of subsurface formations the steps which comprise lowering a gun perforator in said well, horizontally orienting said gun perforator in said well to position its operative surface into a predetermined angular position, vertically moving said oriented perforator adjacent a selected of said formations while maintaining it in said predetermined position, and then firing said oriented gun perforator to pierce said selected formation.*

*10. In a method for completing a well traversing a plurality of subsurface formations, the steps which comprise lowering a perforator in said well, horizontally orienting said perforator in said well to position its operative surface into a predetermined angular position, vertically moving said oriented perforator adjacent a selected of said formations while maintaining it in said predetermined position, operating said oriented perforator to pierce said selected formation, and then producing hydrocarbons from said selected formation.*

*11. In a method for completing a well traversing a plu-*

*rality of subsurface formations, the steps which comprise lowering a perforator in said well, horizontally orienting said perforator in said well to position its operative surface into a predetermined angular position, vertically moving said oriented perforator adjacent a selected of said formations while maintaining it in said predetermined position, and then operating said oriented perforator to pierce said selected formation.*

*12. In a method for completing a well traversing a plurality of subsurface formations, the steps which comprise lowering a perforator in said well, horizontally orienting said perforator in said well to position its operative surface into a predetermined angular position, moving said oriented perforator adjacent a selected of said formations while maintaining it in said predetermined position, and then operating said oriented perforator to pierce said selected formation.*

*13. In a method for completing a well traversing a plurality of subsurface formations, the steps which comprise lowering a perforator in said well, horizontally orienting said perforator and maintaining it with its operative surface positioned in a predetermined angular direction in said well adjacent a selected of said formations, and then operating said oriented perforator to pierce said selected formation.*

References Cited in the file of this patent or in the original patent

UNITED STATES PATENTS

| | | |
|---|---|---|
| 1,238,165 | Lynn | Aug. 28, 1917 |
| 2,679,898 | Forsyth | June 1, 1954 |
| 2,745,497 | Dale | May 15, 1956 |
| 2,749,989 | Huber | June 12, 1956 |
| 2,781,098 | Bielstein | Feb. 12, 1957 |
| 2,785,754 | True | Mar. 19, 1957 |
| 2,796,023 | Abendroth | June 18, 1957 |